Dec. 29, 1936.   N. H. SHERMAN   2,065,830
LAWN RAKE
Filed Feb. 13, 1936

Inventor
Norman H. Sherman
By Owen & Owen
Attorneys

Patented Dec. 29, 1936

2,065,830

UNITED STATES PATENT OFFICE 2,065,830

LAWN RAKE

Norman H. Sherman, Toledo, Ohio, assignor of one-half to Benjamin R. Odland, Toledo, Ohio Application February 13, 1936, Serial No. 63,761

1 Claim. (Cl. 55—10)

This invention relates to lawn rakes and is more particularly directed to the teeth of such rakes.

It has heretofore been proposed to provide elongated, curved teeth for a lawn rake stamped from sheet metal and embossed centrally so that the curved and offset parts of the teeth act as runners in their contact with the ground. In devices of this character, however, the edges of the teeth are flat in a plane perpendicular to the direction in which the rake is pulled with the purpose of gripping and pulling out the roots of weeds which may be growing in the lawn. Further, it has been the practice to space the points of the teeth vertically from the ground so as to prevent injury to the turf.

It has been observed that every common weed which infests lawns grows with a central root and has a top spreading substantially flat against the ground from the root. It is found that a rake having teeth which are in contact with the ground for a substantial distance will get under the flat top part of a weed and raise it to a position where it may be cut off or the root pulled out. Most weeds are as effectively killed by cutting off the tops as by uprooting the entire growth.

It is the primary object of the present invention to provide a rake head having teeth so shaped as to get under and raise the flat top parts of weeds, and subsequently cut off such top parts.

Another object of the invention is the provision of a rake head formed from a single piece of sheet metal punched and embossed to give the desired characteristics to the finished product.

Other objects and advantages of the invention will become apparent as the description proceeds, reference being had to the accompanying drawing, in which—

Figure 1:
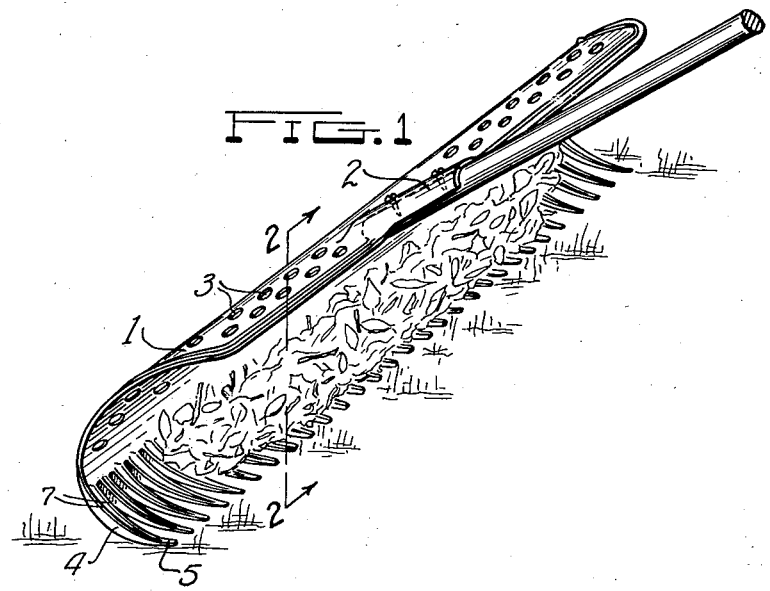
Figure 2:
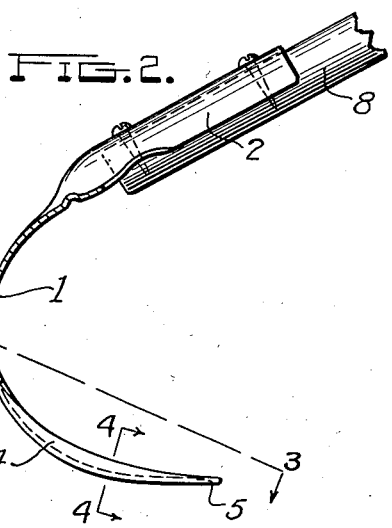
Figure 3:
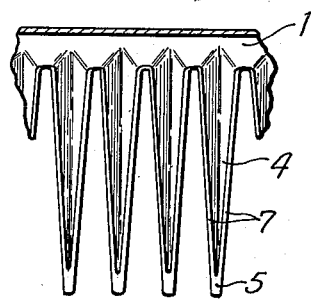
Figure 4:
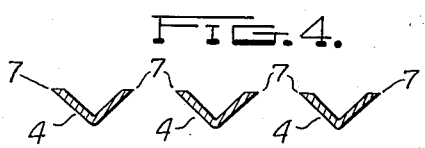
Figure 5:
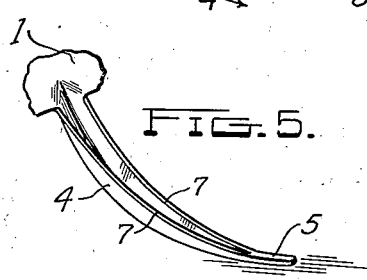

Figure 1 is a perspective view of a rake constructed in accordance with the present invention; Fig. 2 is a section on line 2—2 of Fig. 1; Figs. 3 and 4 are fragmentary sectional views on lines 3—3 and 4—4 of Fig. 2, respectively, Fig. 4 being slightly enlarged, and Fig. 5 is a perspective view of a single tooth constructed in accordance with the present invention.

Referring to the drawing, 1 designates a rake head body formed from a single piece of sheet metal and having a handle extension 2 integral therewith and extending centrally from the rear and upper edge. The body 1 is punched with a plurality of holes 3 so as to weaken the resistance of the body against flexure and allow the rake to bend under a strained condition. During use of the rake, the curved body acts as a shield for the collection of grass, leaves and other material, and greatly increases the capacity of the rake. Spaced, depending, curved teeth 4 are formed integral with the lower edge of the body 1 and continue the curvature of the body. The teeth are evenly curved to a point about one-half inch rearwardly of their points so as to leave flat nose parts 5 for contact with the ground.

The teeth are of V-form in cross-section with their apex portions facing outward with respect to the lengthwise curve of the teeth and are also tapered to points from their inner ends outwardly, thus making the teeth of wedge form and providing the spaces therebetween of similar wedge form with their narrow ends at the inner end portions of the teeth. The free side edges 7 of the teeth, which face upwardly and rearwardly, are sharpened to have a cutting coaction on the top portions of weeds which pass into the tapered spaces between the teeth as the rake is pulled rearwardly. It is found in practice that if the weed tops are not severed from the roots as the sharp edges of the teeth pass across the same, during a rearward pull of the rake, the weeds will become sufficiently wedged within the narrow ends of the spaces between the teeth as to cause a pulling of the weeds from the ground, particularly if the soil is sufficiently soft to facilitate such pulling. The combined cutting and pulling action is very efficient, however, in at least eliminating the top portions of weeds from the lawn.

A handle 8 is received in the body extension 2 and fixed therein in any suitable manner.

While the invention has been described in connection with teeth of a particular form, it should be appreciated that various modifications and changes may be made in the form of the body and of the teeth without departing from the invention as defined in the appended claim.

Having thus described my invention, what I claim as new, and desire to secure by United States Letters Patent, is:

In a rake, a handle, a body connected to the handle transversely thereof and being curved in cross section and formed with teeth at the lower portion of the body having elongated flat nose-like parts at their free ends formed to provide runners which slide on the surface of a lawn or the like, the remaining portions of the teeth being of V-shape in cross section and sharpened to form cutting edges at the top portion of each side thereof, the teeth tapering from their inner ends toward their outer ends whereby to form wedge-like cutters between adjacent teeth, said cutting edges being disposed at an angle to the sides of the teeth and lying in the same plane.

NORMAN H. SHERMAN.